United States Patent
Kapadia et al.

(10) Patent No.: US 10,084,804 B2
(45) Date of Patent: *Sep. 25, 2018

(54) OPTIMIZING SECURITY ANALYSES IN SAAS ENVIRONMENT

(71) Applicant: International Business Machines Corporation, Armonk, NY (US)

(72) Inventors: Kaushal K. Kapadia, Pune (IN); Dhilung H. Kirat, White Plains, NY (US); Youngja Park, Princeton, NJ (US); Marc P. Stoecklin, White Plains, NY (US); Sulakshan Vajipayajula, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,243

(22) Filed: Feb. 6, 2018

(65) Prior Publication Data

US 2018/0212990 A1 Jul. 26, 2018

Related U.S. Application Data

(63) Continuation of application No. 15/414,809, filed on Jan. 25, 2017.

(51) Int. Cl.
*H04L 29/06* (2006.01)
(52) U.S. Cl.
CPC .............................. *H04L 63/1425* (2013.01)

(58) Field of Classification Search
CPC .................................................. H04L 63/1425
See application file for complete search history.

(56) References Cited

U.S. PATENT DOCUMENTS

| | | | |
|---|---|---|---|
| 9,465,939 B2 | 10/2016 | Alme et al. | |
| 2015/0356301 A1 | 12/2015 | Diehl et al. | |
| 2016/0063249 A1* | 3/2016 | Spernow | G06F 21/562 726/23 |
| 2016/0112444 A1* | 4/2016 | Palumbo | G06F 21/567 726/23 |
| 2017/0063909 A1 | 3/2017 | Muddu et al. | |
| 2017/0118236 A1 | 4/2017 | Devi Reddy et al. | |
| 2017/0302685 A1* | 10/2017 | Ladnai | G06F 17/30958 |

FOREIGN PATENT DOCUMENTS

WO 2016138067 A1 9/2016

OTHER PUBLICATIONS

Balakrishnan, Balaji, "Applying Machine Learning Techniques to Measure Critical Security Controls", SANS Institute Reading Room, Sep. 1, 2016, ©2016 The Sans Institute, 40 pages.

(Continued)

*Primary Examiner* — Noura Zoubair
(74) *Attorney, Agent, or Firm* — Brian M. Restauro

(57) ABSTRACT

Embodiments of the present invention provide systems and methods for performing a security analysis on a set of observables by inferring malicious relationships. The method includes receiving a set of observables and structured and unstructured threat data. The method further includes analyzing the observables and the structured and unstructured threat data using cognitive computing, and creating and transferring a subgraph.

1 Claim, 11 Drawing Sheets

(56) References Cited

OTHER PUBLICATIONS

Mell et al., "The NIST Definition of Cloud Computing", National Institute of Standards and Technology, Special Publication 800-145, Computer Security Division, Gaithersburg, MD, Sep. 2011, 7 pages.
"Protect your Cloud with Cloud Security Services", Cloud 4C Tier 4 Cloud, Copyright © 2016 Ctrl4C Cloud Services Pvt. Ltd., <https://www.cloud4c.com/cloud-security-services.php?gclid=Cla_u4KwuM0CFZcWaAodbpwEMw>, 7 pages.
"Security as a Service Working Group", CSA, cloud security alliance ®, © 2009-2016 Cloud Security Alliance, <https://cloudsecurityalliance.org/group/security-as-a-service/>, 3 pages.
Kapadia et al. "Optimizing Security Analyses in SAAS Environments", U.S. Appl. No. 15/414,809, filed Jan. 25, 2017, IBM Docket No. IN920160366US1, 34 pages.
Appendix P—List of IBM Patents or Patent Applications Treated as Related, Filed herewith, 2 Pages.
Srinivaasan, Gayathri, "Malicious Entity Categorization using Graph Modeling" Master's Degree Project, Degree Project in Information and Communication Technology, Stockholm, Sweden 2016, 62 pages.

\* cited by examiner

600B

"skg10":{
 "id":"skg10",
 "nlq":"Get all observables associated with a given Domain Name %DomainName%. You can specify targeted observables in TARGET parameter(optional)", "gremlin":"def g = graph.traversal(); g.V().has('value','%DomainName%').hasLabel('DomainName')", "params":["DomainName"],
 "targets":["Url","IpAddress","WebCategory","Reputation","Hash"],
 "Url":{

"gremlin":"repeat(bothE('SUBDOMAIN').limit(%limit%).bothV().simplePath()).times(%limit%).union(inE('CONTAINS').limit(%limit%).outV(),outE('RESOLVE').has('lastUpdate',inside(%starttime%,%endtime%)).limit(%limit%).inV().hasLabel('IpAddress').inE('CONTAINS').limit(%limit%).outV()).hasLabel('Endpoint').union(bothE('CONNECT','USES','LINKS').limit(%limit%).bothV().hasLabel('File').outE('CONNECT').limit(%limit%).inV().inE('CONTAINS').limit(%limit%).outV()).hasLabel('Url').path()",
  "timegremlin":""
 }, "IpAddress":{

"gremlin":"union(outE('EMAIL_SEND').limit(%limit%).inV().outE('ATTACHMENT').limit(%limit%).inV().inE('ATTACHMENT').limit(%limit%).outV().inE('EMAIL_SEND').limit(%limit%).outV().hasLabel('IpAddress').path(),bothE('RESOLVE').has('lastUpdate',inside(%starttime%,%endtime%)).limit(%limit%).bothV().hasLabel('IpAddress').path(),repeat(bothE('SUBDOMAIN').limit(%limit%).bothV().simplePath()).times(%limit%).hasLabel('DomainName').bothE('RESOLVE').has('lastUpdate',inside(%starttime%,%endtime%)).limit(%limit%).bothV().hasLabel('IpAddress').path(),inE('CONTAINS').limit(%limit%).outV().hasLabel('Endpoint').union(bothE('LINK','USES','CONNECT').limit(%limit%).bothV().inE('CONTAINS').limit(%limit%).outV().hasLabel('Url').inE('CONNECT').limit(%limit%).outV()).hasLabel('File').bothE('CONNECT','LINKS').limit(%limit%).bothV().hasLabel('IpAddress').path())",
  "timegremlin":""
 }, "WebCategory":{

"gremlin":"union(outE('CATEGORY').limit(%limit%).inV().hasLabel('Category').path(),repeat(bothE('SUBDOMAIN').limit(%limit%).bothV().simplePath()).times(%limit%).outE('CATEGORY').limit(%limit%).inV().hasLabel('Category').path())",
  "timegremlin":""
 }, "Reputation":{

"gremlin":"union(outE('REPUTATION').has('lastUpdate',inside(%starttime%,%endtime%)).limit(%limit%).inV().hasLabel('Reputation').path(),repeat(bothE('SUBDOMAIN').limit(%limit%).bothV().simplePath()).times(%limit%).outE('REPUTATION').has('lastUpdate',inside(%starttime%,%endtime%)).limit(%limit%).inV().hasLabel('Reputation').path())",
  "timegremlin":""
 }, "Hash":{

"gremlin":"union(outE('EMAIL_SEND').limit(%limit%).inV().outE('ATTACHMENT').limit(%limit%).inV().hasLabel('File').outE('HASH').inV().hasLabel('Hash').path(),repeat(bothE('SUBDOMAIN').limit(%limit%).bothV().simplePath()).times(%limit%).union(bothE('USES','CONNECT','LINKS').limit(%limit%).bothV().inE('CONTAINS').limit(%limit%).outV().hasLabel('Url').inE('CONNECT').limit(%limit%).outV()).hasLabel('File').outE('HASH').inV().hasLabel('Hash').path(),repeat(bothE('SUBDOMAIN').limit(%limit%).bothV().simplePath()).times(%limit%).outE('RESOLVE').has('lastUpdate',inside(%starttime%,%endtime%)).limit(%limit%).inV().hasLabel('IpAddress').bothE('LINKS','CONNECT').limit(%limit%).bothV().hasLabel('File').outE('HASH').inV().hasLabel('Hash').path())",
  "timegremlin":""
 }
},

"skg12":{
    "id":"skg12",
    "nlq":"Get all observables associated with a given Hash %Hash%. You can specify targeted observables in TARGET parameter(optional)", "gremlin":"def g = graph.traversal();
g.V().has('value','%Hash%').hasLabel('Hash').repeat(inE().outV().simplePath()).until(hasLabel('File'))", "params":["Hash"], "targets":["Url","DomainName","IpAddress","FileName","MalwareFamily","AvSignature","Reputation"],
    "DomainName":{

"gremlin":"union(inE('ATTACHMENT').limit(%limit%).outV().inE('EMAIL_SEND').limit(%limit%).outV().hasLabel('DomainName').path(),inE('ATTACHMENT').limit(%limit%).outV().inE('EMAIL_SEND').limit(%limit%).outV().hasLabel('IpAddress').inE('RESOLVE').has('lastUpdate',inside(%starttime%,%endtime%)).limit(%limit%).outV().hasLabel('DomainName').path(),repeat(bothE('CONNECT','CONTAIN','LINKS','USES').limit(%limit%).bothV()).times(2).hasLabel('Endpoint').outE('CONTAIN').limit(%limit%).inV().hasLabel('DomainName').path(),bothE('CONNECT','LINKS').limit(%limit%).bothV().hasLabel('IpAddress').inE('RESOLVE').has('lastUpdate',inside(%starttime%,%endtime%)).limit(%limit%).outV().hasLabel('DomainName').path())",
    "timegremlin":""
    },
    "Url":{

"gremlin":"union(bothE('CONNECT','LINKS').limit(%limit%).bothV().hasLabel('Url').path(),bothE('USES','LINKS','CONNECT','CONTAIN').limit(%limit%).bothV().hasLabel('EndPoint').inE('CONTAIN').limit(%limit%).outV().hasLabel('Url').path(),bothE('CONNECT','LINKS').limit(%limit%).bothV().hasLabel('IpAddress').inE('RESOLVE').has('lastUpdate',inside(%starttime%,%endtime%)).limit(%limit%).outV().hasLabel('DomainName').inE('CONTAINS').limit(%limit%).outV().inE('CONTAINS').limit(%limit%).outV().hasLabel('Url').path())",
    "timegremlin":""
    },
    "IpAddress":{

"gremlin":"union(inE('ATTACHMENT').limit(%limit%).outV().inE('EMAIL_SEND').limit(%limit%).outV().hasLabel('IpAddress').path(),bothE('CONNECT','LINKS').limit(%limit%).bothV().hasLabel('IpAddress').path(),repeat(bothE('CONTAIN','CONNECT','USES','LINKS').limit(%limit%).bothV().simplePath()).times(2).hasLabel('Endpoint').outE('CONTAINS').limit(%limit%).inV().hasLabel('DomainName').outE('RESOLVE').has('lastUpdate',inside(%starttime%,%endtime%)).limit(%limit%).inV().hasLabel('IpAddress').path())",
    "timegremlin":""
    },
    "FileName":{

"gremlin":"outE('FILENAME').limit(%limit%).inV().hasLabel('Filename').path()",
    "timegremlin":""
    },
    "MalwareFamily":{

"gremlin":"outE('MALWARE_FAMILY').limit(%limit%).inV().hasLabel('MalwareFamily').path()",
    "timegremlin":""
    },
    "Reputation":{

"gremlin":"outE('REPUTATION').limit(%limit%).inV().hasLabel('Reputation').path()",
    "timegremlin":""
    },
    "AvSignature":{

"gremlin":"outE('AVSIGNATURE','MATCH').limit(%limit%).inV().hasLabel('AvSignature','VirusSignature').path()",
    "timegremlin":""
    }

```
"skg13":{
            "id":"skg13",
            "nlq":"Get all observables associated with a given Url %Url%. You can specify targeted observables in TARGET parameter(optional)",
            "gremlin":"def g = graph.traversal(); g.V().has('value','%Url%').hasLabel('Url')",
            "params":["Url"],
            "targets":["Hash","Reputation","WebCategory","FileName","MalwareFamily","AvSignature"],
            "Hash":{

"gremlin":"union(union(bothE('CONNECT','LINKS').limit(%limit%).bothV().outE('CONTAINS').limit(%limit%).inV().hasLabel('Endpoint').union(bothE('USES','CONNECT').limit(%limit%).bothV(),outE('CONTAINS').limit(%limit%).inV().hasLabel('IpAddress').bothE('CONNECT','LINKS').limit(%limit%).bothV(),repeat(outE('CONTAINS').limit(%limit%).inV()).times(2).hasLabel('DomainName').repeat(bothE('SUBDOMAIN').limit(%limit%).bothV().simplePath()).times(%limit%).outE('RESOLVE').has('lastUpdate',inside(%starttime%,%endtime%)).limit(%limit%).inV().hasLabel('IpAddress').bothE('CONNECT','LINKS').limit(%limit%).bothV())).hasLabel('File').outE('HASH').inV().hasLabel('Hash').path())",
                        "timegremlin":""
            },
            "Reputation":{

"gremlin":"union(outE('REPUTATION').has('lastUpdate',inside(%starttime%,%endtime%)).limit(%limit%).inV().hasLabel('Reputation').path(),repeat(outE('CONTAINS').limit(%limit%).inV().simplePath()).times(2).hasLabel('IpAddress','DomainName').outE('REPUTATION').has('lastUpdate',inside(%starttime%,%endtime%)).limit(%limit%).inV().hasLabel('Reputation').path())",
                        "timegremlin":""
            },
            "WebCategory":{

"gremlin":"union(outE('CATEGORY').limit(%limit%).inV().hasLabel('Category').path(),repeat(outE('CONTAINS').limit(%limit%).inV()).times(2).hasLabel('IpAddress','DomainName').outE('CATEGORY').limit(%limit%).inV().hasLabel('Category').path())",
                        "timegremlin":""
            },
            "FileName":{

"gremlin":"union(union(bothE('CONNECT','LINKS').limit(%limit%).bothV().outE('CONTAINS').limit(%limit%).inV().hasLabel('Endpoint').union(bothE('USES','CONNECT').limit(%limit%).bothV(),outE('CONTAINS').limit(%limit%).inV().hasLabel('IpAddress').bothE('CONNECT','LINKS').limit(%limit%).bothV(),repeat(outE('CONTAINS').limit(%limit%).inV()).times(2).hasLabel('DomainName').repeat(bothE('SUBDOMAIN').limit(%limit%).bothV().simplePath()).times(%limit%).outE('RESOLVE').has('lastUpdate',inside(%starttime%,%endtime%)).limit(%limit%).inV().hasLabel('IpAddress').bothE('CONNECT','LINKS').limit(%limit%).bothV())).hasLabel('File').outE('FILENAME').inV().hasLabel('Filename').path())",
                        "timegremlin":""
            },
            "MalwareFamily":{

"gremlin":"union(union(bothE('CONNECT','LINKS').limit(%limit%).bothV().outE('CONTAINS').limit(%limit%).inV().hasLabel('Endpoint').union(bothE('USES','CONNECT').limit(%limit%).bothV(),outE('CONTAINS').limit(%limit%).inV().hasLabel('IpAddress').bothE('CONNECT','LINKS').limit(%limit%).bothV(),repeat(outE('CONTAINS').limit(%limit%).inV()).times(2).hasLabel('DomainName').repeat(bothE('SUBDOMAIN').limit(%limit%).bothV().simplePath()).times(%limit%).outE('RESOLVE').has('lastUpdate',inside(%starttime%,%endtime%)).limit(%limit%).inV().hasLabel('IpAddress').bothE('CONNECT','LINKS').limit(%limit%).bothV())).hasLabel('File').outE('MALWARE_FAMILY').limit(%limit%).inV().hasLabel('MalwareFamily').path())",
                        "timegremlin":""
            },
            "AvSignature":{

"gremlin":"union(union(bothE('CONNECT','LINKS').limit(%limit%).bothV().outE('CONTAINS').limit(%limit%).inV().hasLabel('Endpoint').union(bothE('USES','CONNECT').limit(%limit%).bothV(),outE('CONTAINS').limit(%limit%).inV().hasLabel('IpAddress').bothE('CONNECT','LINKS').limit(%limit%).bothV(),repeat(outE('CONTAINS').limit(%limit%).inV()).times(2).hasLabel('DomainName').repeat(bothE('SUBDOMAIN').limit(%limit%).bothV().simplePath()).times(%limit%).outE('RESOLVE').has('lastUpdate',inside(%starttime%,%endtime%)).limit(%limit%).inV().hasLabel('IpAddress').bothE('CONNECT','LINKS').limit(%limit%).bothV())).hasLabel('File').outE('AVSIGNATURE','MATCH').limit(%limit%).inV().hasLabel('AvSignature','VirusSignature').path())",
                        "timegremlin":""
            }
        }
    }
```

FIG. 6E

OPTIMIZING SECURITY ANALYSES IN SAAS ENVIRONMENT

BACKGROUND OF THE INVENTION

The present invention relates generally to computer security analysis, and more particularly to a Software as a Service (SaaS) based service where security analysis is performed on a set of observables through inferring malicious relationships based on structured and unstructured security systems and databases.

Security risks are continuously mutating and investigating security related events have become very complex. However, security products can be enabled through a cloud based, SaaS based offering that utilizes such things as cognitive, or unstructured, and structured security systems and databases. This allows security analysis to factor in the latest data, including both structured and unstructured threat data, for the reported observables in a security event.

SUMMARY

According to one embodiment of the present invention, a method for performing a security analysis on a set of observables by inferring malicious relationships. The method includes receiving, by one or more processors, a set of observables from an interfacing entity, and one or more of: a set of structured threat data and a set of unstructured threat data; analyzing, by one or more processors, at least one of the set of observables, the set of structured threat data, and the set of unstructured threat data, wherein at least one of an observable of the set of observables, the set of structured threat data, and the set of unstructured threat data is analyzed using cognitive computing; creating, by one or more processors, a subgraph, based, at least in part, on the analysis; and transferring, by one or more processors, the subgraph to the interfacing entity.

According to another embodiment of the present invention, a computer program product for enhancing the processing of workloads is provided, based on the method described above.

According to another embodiment of the present invention, a computer system for enhancing the processing of workloads is provided, based on the method described above.

BRIEF DESCRIPTION OF THE DRAWINGS

FIG. 6B is a visual representation of a code which is used to find an observed domain name's connections to various other observables, in accordance with an embodiment of the present invention;

FIG. 6D is a visual representation of a code which is used to find an observed hash's connections to various other observables, in accordance with an embodiment of the present invention;

FIG. 6E is a visual representation of a code which is used to find an observed URL's connections to various other observables, in accordance with an embodiment of the present invention.

DETAILED DESCRIPTION

Security risks to computer systems, data, networks, etc. are an ever evolving and mutating issue. Investigating and analyzing these security events becomes more complex the more the security risks evolve and become more complex themselves.

Embodiments of the present invention recognize the need to factor in the latest data for the reported observables in a security risk event in order to improve security analysis. For example, security products may be enabled through an entirely cloud based Software as a Service (SaaS) based offering that uses both cognitive and structured security systems. This would improve security analysis in multiple ways, such as providing the capability to use the latest and most updated techniques, and would improve security efficiency through the combined use of cognitive analysis to discern connections. Embodiments of the present invention provide solutions to improve digital security analysis using both structured threat data, such as organized threat databases, and unstructured threat data, such as security blogs, articles, publications, etc. In this manner, as discussed in greater detail herein, embodiments of the present invention can provide solutions for improving security risk analysis.

Figure 1:
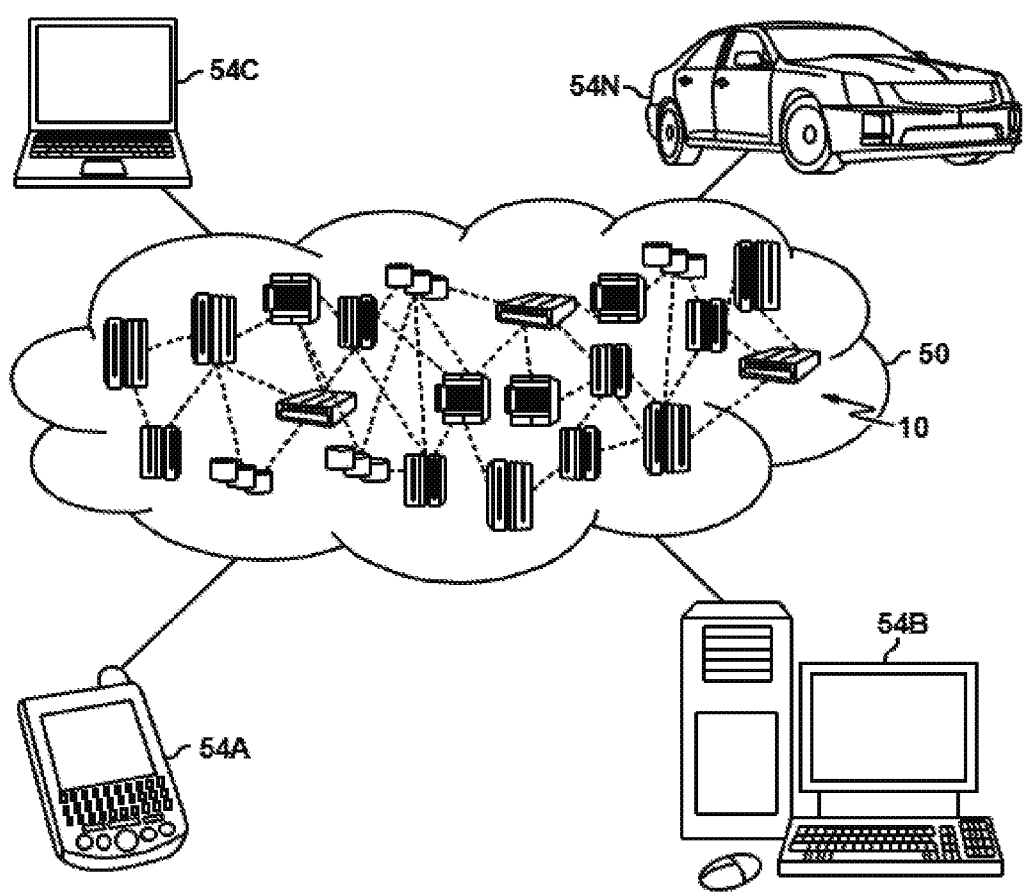
FIG. 1 is a cloud computing environment, in accordance with an embodiment of the present invention.

The present invention will now be described in detail with reference to the Figures. FIG. 1 is a cloud computing environment, in accordance with an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
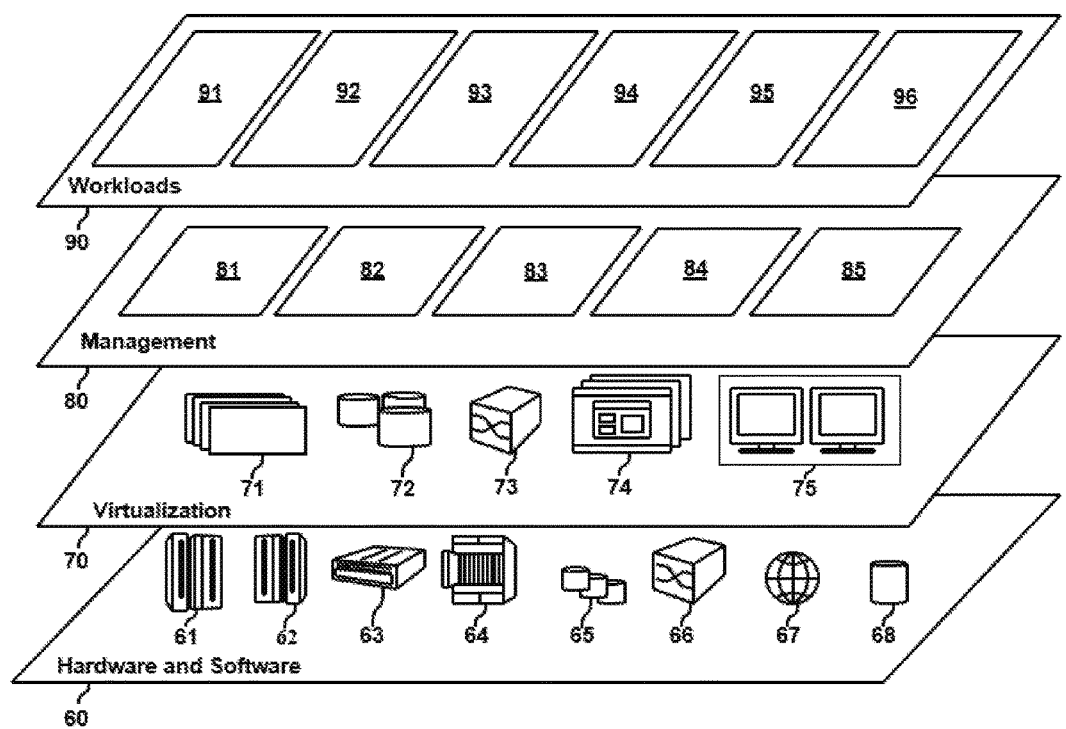
FIG. 2 is an abstraction model layer, in accordance with an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security analysis 96.

Figure 3:
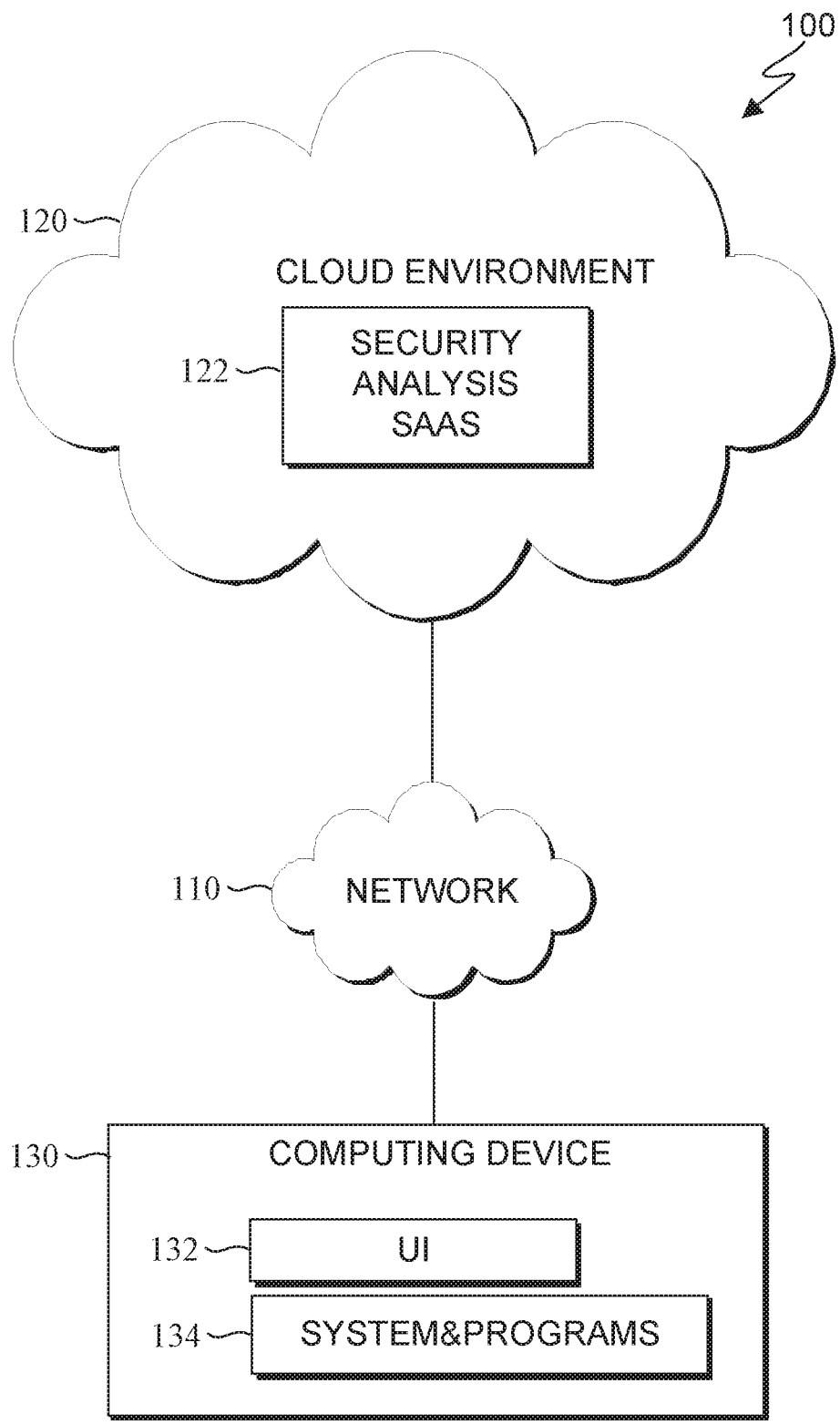
FIG. 3 is a functional block diagram illustrating a data processing environment, in accordance with an embodiment of the present invention.

FIG. 3 is a functional block diagram illustrating a data processing environment, generally designated 100, in accordance with an embodiment of the present invention. Modifications to data processing environment 100 may be made by those skilled in the art without departing from the scope of the invention as recited by the claims. In an exemplary embodiment, data processing environment 100 includes cloud environment 120 and computing device 130, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication and/or access between cloud environment 120 and computing device 130.

Computing device 130 includes UI 132 and system&programs 134. In various embodiments of the present invention, computing device 130 can be a laptop computer, a tablet computer, a netbook computer, a personal computer (PC), a desktop computer, a server computer, a personal digital assistant (PDA), a smart phone, a thin client, or any programmable electronic device capable of executing computer readable program instructions. Computing device 130 may include internal and external hardware components, as depicted and described in further detail with respect to FIG. 7.

UI 132 is a user interface that can display text, documents, web browser windows, user options, application interfaces, and instructions for operation. In this embodiment, UI 132 may be, for example, a graphical user interface (GUI) or a web user interface (WUI). UI 132 may also include the information a program presents to a user (such as graphics, text, and sound) and the control sequences the user employs to control the program. UI 132 is capable of receiving data, user commands, and data input modifications from a user. UI 132 is also capable of communicating with system&programs 134.

System&programs 134 is any of a variety of software on computing device 130. This software may include any system software that manages computer hardware and software resources, computer programs, libraries and related non-executable data, applications such as word processors, spreadsheets, antivirus software, etc., internet browsers, device drivers, databases, etc. System&programs 134 may interact with UI 132, cloud environment 120, network 110, other computing devices and peripherals (not shown), etc. In some embodiments, system&programs 134 determines the reported observables in a security event and transfers the information as needed.

Cloud environment 120 is a cloud based computing environment, and includes security analysis SaaS 122. In this embodiment, cloud environment 120 is a network of servers with various functions, which are accessible, generally, from anywhere with an internet connection. For example, some of the servers that make up cloud environment 120 may use computing power to run applications, while other servers may be used for storing data. Cloud environment 120 may be a small or large network of servers, and may be housed locally to computing device 130, such as in the same building, or may be housed globally, such as in a different country. In additional embodiments, the servers for cloud environment 120 are housed in multiple locations at the same time, and connected to each other over network 110. Cloud environment 120 is described in more detail in FIG. 1 and FIG. 2.

Security analysis SaaS 122 interacts with a variety of different programs, functions, and connections to improve cloud security. In this embodiment, security analysis SaaS 122 is designed to offer improved security analysis in a cloud environment, utilizing cognitive services, structured and unstructured threat data, structured security systems and databases, etc. Security analysis SaaS 122 receives and analyzes observables from a security event to derive direct and indirect relationships between the observables in order to determine the threat level. In this embodiment, security analysis SaaS 122 then returns the results so as to display the possible solutions to the user, increase the level and efficiency of response to the security incident by computing device 130, etc. FIG. 4-FIG. 6E describe examples of security analysis SaaS 122 duties and operational steps in more detail.

Figure 4:
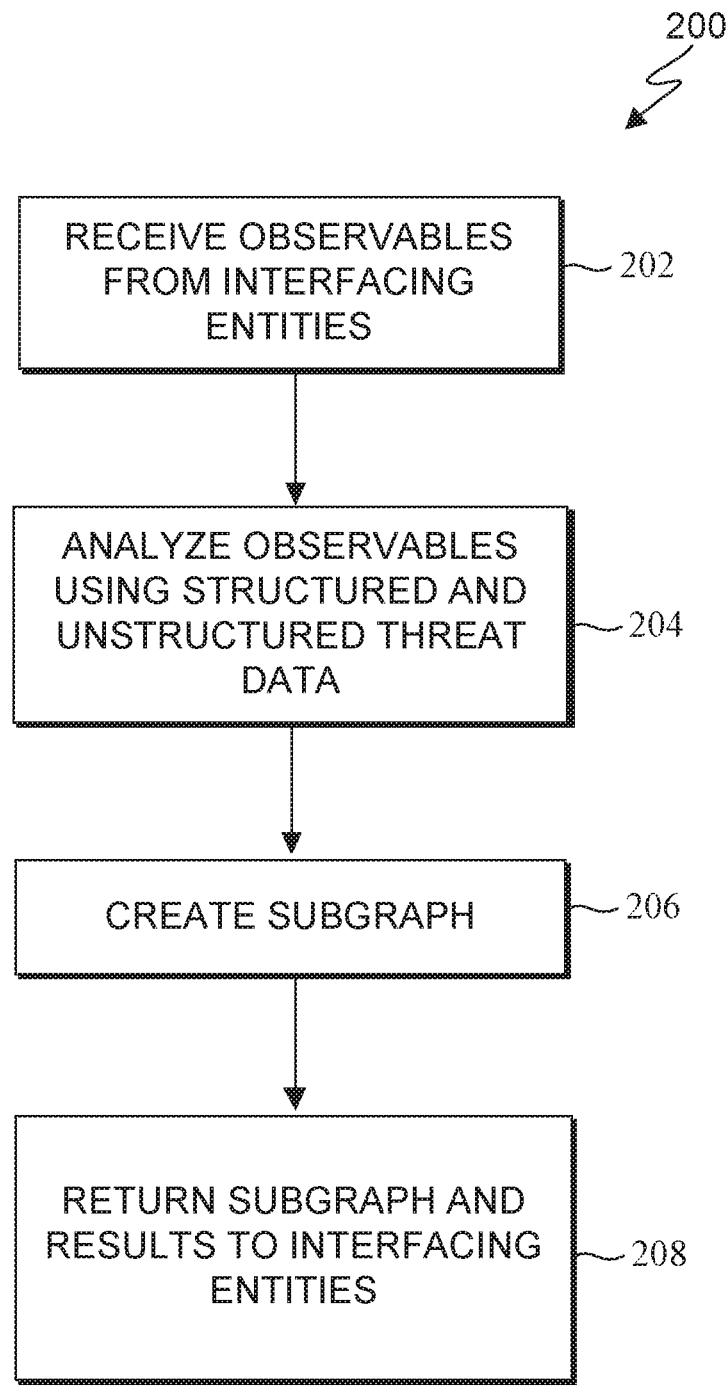
FIG. 4 is a flowchart illustrating operational steps for analyzing and inferring security threats using structured and unstructured threat data to analyze security incident observables, in accordance with an embodiment of the present invention.

FIG. 4 is a flowchart 200 illustrating operational steps for analyzing and inferring security threats using structured and unstructured threat data to analyze security incident observables, in accordance with an embodiment of the present invention.

In step 202, security analysis SaaS 122 receives observables from interfacing entities. In this exemplary embodiment, observables are indicators or a property within a security event reported by any external security screening system such an antivirus software. The observables may be programs that are malicious software, malicious connections, or other entities in a security event. Observables may change depending on the interfacing entity, the time when the observables were recorded, etc. Interfacing entities may be devices such as computing device 130 or other devices that perform functions such as running software, creating network connections, displaying or receiving data from a user, etc. In this embodiment, security analysis SaaS 122 receives observables through connections such as network 110 or other electronic pathways. In various embodiments, pathways through which security analysis SaaS 122 receive the observables are pathways that help maintain the security of the information, so that the information is not corrupted or blocked by the security threat. In yet other embodiments, security analysis SaaS 122 can receive observables from one or more other components of data processing environment 100 of FIG. 3. In yet other embodiments, security analysis 122 can detect security threats and receive observables from one or more other components of data processing environment 100 of FIG. 3.

In step 204, security analysis SaaS 122 analyzes observables using structured and unstructured threat data. In this exemplary embodiment, structured threat data is data found in organized threat databases. These databases may be from third party providers, from the provider of security analysis SaaS 122, from the interfacing entities, or any combination thereof. Security analysis SaaS 122 analyzes the available structured threat data in order to determine the relevant information for the particular set of observables received. Unstructured threat data, as used herein, refers to data from such sources as security blogs, security articles, publications and academic papers that deal with security threats, etc. The unstructured threat data is analyzed through cognitive computing, such as by any combination of machine learning techniques, natural language processing, human-computer interaction, other artificial intelligence or signal processing means, etc. in order to determine the relevant information for the particular set of observables received. In some embodiments, the relevance of information is determined by assigning weight or percentages of relation. The relevant information comprises any that exists above a certain predetermined threshold is. In other embodiments, observables from multiple interfacing entities may be analyzed in parallel, in order to, for instance, find commonalities, create broad solutions, etc.

In various embodiments, security analysis SaaS 122 uses cognitive computing to infer security threats based on observables received, unstructured threat data, structured threat data, etc. Cognitive computing as used herein, refers to, processing information utilizing any combination of machine learning techniques, natural language processing, human-computer interaction, other artificial intelligence or signal processing means, etc. For example, in this embodiment, security analysis SaaS 122 can utilize cognitive computing in order to determine the relevant information for the particular set of observables received. Relevance is determined by means such as where the cognitive system has learned how to determine a relevance threshold, so that if a piece of processed information exceeds that threshold, that piece of information would be determined to be relevant. In various additional embodiments, security analysis SaaS 122 utilizes a server-less computer architecture running such things as an ephemeral container, security algorithms, etc. to help with the analysis.

In step 206, security analysis SaaS 122 creates a subgraph. In this exemplary embodiment, the subgraph is a subset representation of the structured and unstructured threat data determined by security analysis SaaS 122 and the cognitive computing analysis to be the relevant threat data information for the analyzed observable incident. The subgraph may aid in continued security analysis and threat prevention. In various embodiments, the subgraph may continue to be updated as relevant information becomes available. This relevant information may include structured threat data, unstructured threat data, updates from the interfacing entities, etc.

In other embodiments, the subgraph and results may provide complete solutions for the malicious software and connections. For example, the subgraph may provide complete solutions that are selectable inputs (e.g., by a user). Security analysis SaaS 122 can then update the subgraph to show the reflected choices. For example, security analysis SaaS 122 may provide two solutions, solution A and solution B. Both complete solutions have the same level of effectiveness. Once the selection is made, security analysis SaaS 122 can update the subgraph with the preferred solution.

In yet other embodiments, the subgraph may provide information, such as solutions, links, downloads, etc., in a format that is able to be read and interacted with by a human user, such as through UI 132. For example, the subgraph may offer the human user a link to a downloadable security patch, and information on how to install the security patch. The human user may then click on the link offered by security analysis SaaS 122 in order to install the security patch.

In step 208, security analysis SaaS 122 returns the subgraph and any other results, as necessary, to the interfacing entities. In this exemplary embodiment, the subgraph and other results are returned in order to help improve the interfacing entities ability to combat malicious software and connections, and are returned for use by system&programs 134. The form in which the subgraph and results are returned and the way in which the results are returned may vary depending on the software and hardware of the interfacing entity. In some embodiments, the results are specifically returned through intelligent traversals (i.e., pathways that allow the data to be transferred without being corrupted by malicious incidences, software, etc.). In additional embodiments, the subgraph and results may be updated and returned as other structured and unstructured threat data is determined to be relevant by security analysis SaaS 122. In yet other embodiments, security analysis SaaS 122 may return updated data as it interacts with the interfacing entity or a human user of the interfacing entity. For example, if the subgraph fixes one problem, but the security threat causes multiple threats that are only discoverable once one threat has been solved, the interfacing entity may communicate this to security analysis SaaS 122 for continued help. In some instances, if security analysis SaaS 122 needs additional information from the interfacing entity or a human user, continued interaction or a back and forth exchange of data and commands may occur, and the subgraph may be updated or modified according to the exchange. In yet other embodiments, when access has been obtained by security analysis SaaS 122, or granted by the interfacing entity, security analysis SaaS 122 can utilize the subgraph to initiate or perform the suggested solutions on the interfacing entity.

Figure 5:
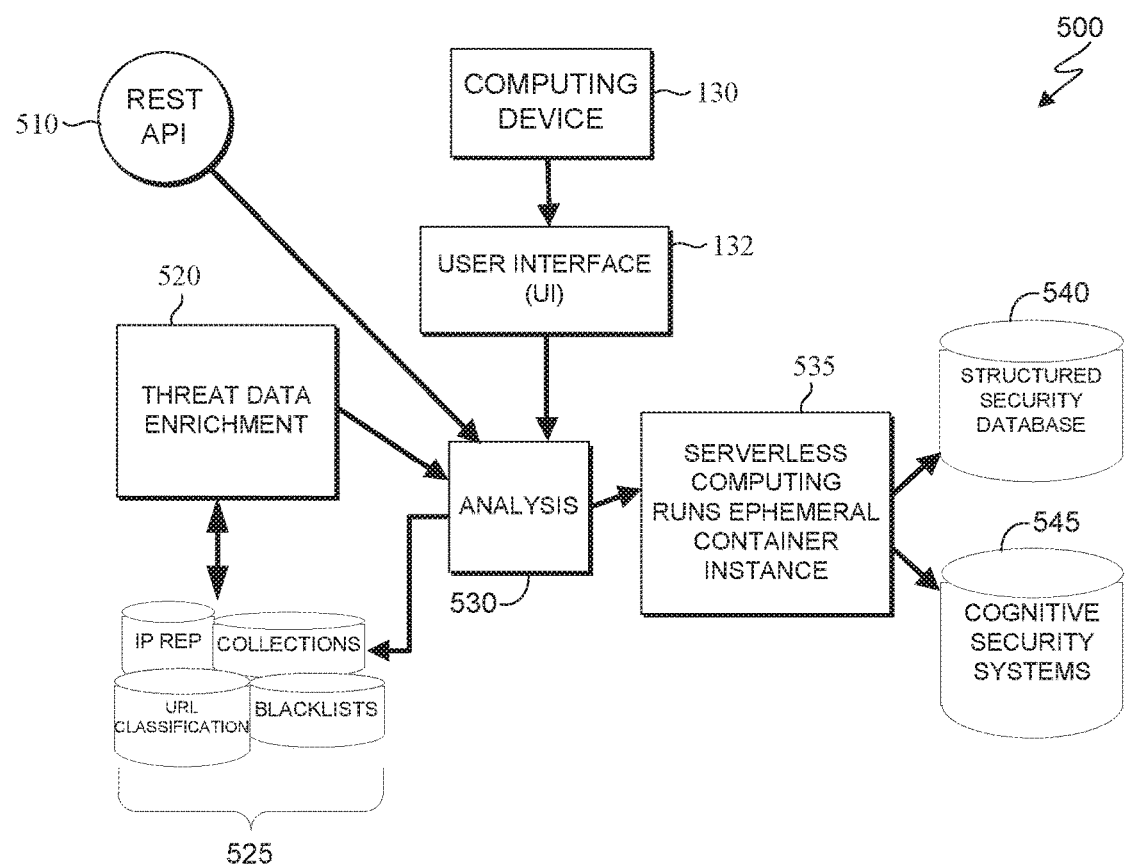
FIG. 5 is a visual representation of the process required for security analysis, in accordance with an embodiment of the present invention.

FIG. 5 is a visual representation 500 of the processes required for security analysis SaaS 122, in accordance with an embodiment of the present invention.

In this exemplary embodiment, the general implementation steps of FIG. 5, wherein security analysis SaaS 122 performs a security analysis on a set of observables through inferring malicious relationships, are as follows:

Security analysis SaaS 122 utilizes cognitive computing, such as a cognitive security system (e.g., a cognitive computing system that has been taught to recognize and learn from structured and unstructured threat data), in order to analyze unstructured security data, and structured security databases to determine malicious association of the observables passed to the application program interface (API) through intelligent traversals (i.e., pathways that allow the data to be transferred without being corrupted by malicious incidences, software, etc.).

A representational state transfer (REST) API, such as rest API 510, can be used with, for example, a tool (not shown) that enables computing device 130 to interact with the analysis from security analysis SaaS 122, and may allow a user of computing device 130 or UI 132 to visualize, explore, and analyze configuration information and the analysis. For example, if the received observables are malicious software or connections, security analysis SaaS 122 may return an analysis that helps the interfacing entity to quarantine and/or delete the malicious software. Additionally, security analysis SaaS 122 may return data to the user through computing device 130 or UI 132 that allows the user to determine and implement a course of action.

Threat data enrichment 520 receives additional information from various sources 525, and may be part of security analysis SaaS 122 or a separate program or device. The additional information received from various sources 525 may be collections of security databases, information on URLs, etc. The additional information is transferred along with the observables from the security event to analysis 530. Analysis 530 is the part of security analysis SaaS 122 that uses server-less computing (such as shown in step 535) for running security algorithms and receiving and transferring structured and unstructured security databases and data between such systems and programs as structured security database 540 and cognitive security systems 545. In various embodiments, in the server-less cloud computing environment an ephemeral container is run containing, for example, security analysis algorithms, etc. such as those further detailed in FIG. 6A-E.

In various embodiments, an asynchronous API (not shown) allows the interfacing entities to pull the results of the analysis without getting blocked, or the data getting corrupted, by the malicious entities.

In various other embodiments, security analysis SaaS 122 returns analyzed security data as a subgraph depicting malicious relationships, in order to aid the security analyst in incident analysis.

In additional embodiments, security analysis SaaS 122 uses graph databases to determine and link related entities aiding in effective and security specific aware intelligent traversals.

FIG. 6A-FIG. 6E are representations of how connections between entities are examined for malicious incidences, in accordance with an embodiment of the present invention. Security analysis primarily involves deriving direct and indirect relationships between several observables in the structured and unstructured data. Various data sets, such as Internet Protocol (IP) reputation, Domain Name System (DNS) resolutions over a given period of time, URL reputation, file signature matching, and behavior analytics data, may be combined to form a single connected graph. As shown in FIG. 6A-E, the connections between entities such as hashes, domains, malware families, URLs, computer files (hereinafter "files"), antivirus signatures, DNS entries, WhoIs information, etc., may be examined for maliciousness through traversals. Note that not all entities listed and their connections are shown in FIG. 6A-FIG. 6E.

Figure 6A:
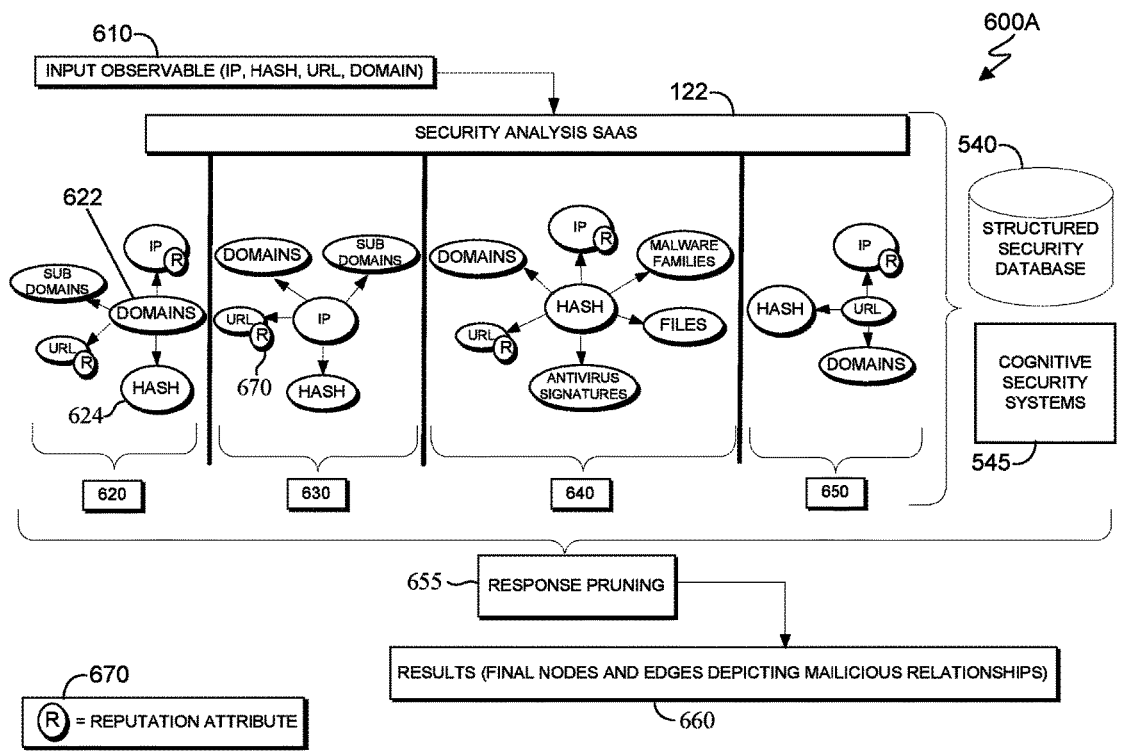
FIG. 6A is a visual representation of the observables and their connections, in accordance with an embodiment of the present invention.

In this exemplary embodiment, FIG. 6A is a visual representation 600A of the observables and their connections. In this exemplary embodiment, the observables that are input into security analysis SaaS 122 are broken down into main observables, such as observables 610. The main observables are then placed in sets, or groups, such as group 620, so that there is one main observable, such as domains 622, and that main observable is grouped with its determined connections, such as hash 624. There may be multiple main observables with their own set, or group, of multiple determined connections, such as is shown in groups 620, 630, 640, and 650. In this example, visual representation 600A shows each main observable as uniquely identified across the various data sets as a single node and interconnected edges. An example of this is group 620 where domains 622 is the main observable and is show interconnected with hash 624. It is then possible for security analysis SaaS 122 to use the uniquely crafted queries across these groups, with possible assistance from structured security database 540 and cognitive security systems 545 (discussed previously, in more detail in FIG. 5) to find connected observables and derive toxicity of the observables based on their connections with other observables. Security analysis SaaS 122 then prunes and enriches the results through response pruning 655 and produces results 660.

Response pruning 655 is accomplished by pruning (i.e., removing) redundant and masked data and enriching the results using the latest security data from structured threat data, unstructured threat data, private collection threat data, blacklists, Uniform Resource Locator (URL) classification data, etc. This enrichment may include such things as updating specific information, adding new information, adding information to previously existing entries, removing incorrect information, etc. In various embodiments, the latest security data used (not shown) is from such sources as the interfacing entities and threat data information compiled or otherwise generated by security analysis SaaS 122 (e.g., own collection of threat data information, third party vendors, etc.).

In this embodiment, results 660 is a mapping structure with the final nodes and edges depicting malicious relationships (e.g., steps 206 and 208 in FIG. 4). In various embodiments, reputation attribute 670 is a mechanism for establishing trust for online interactions. These mechanisms may include such items, or a combination of such items, as the security and encryption used by the online site, verifications and ratings by trusted third parties, user ratings and reviews, etc.

In this exemplary embodiment, FIG. 6B is a visual representation of a code 600B which is used to find an observed domain name's connections to various other observables, such as a URL, IP address, or file. In various embodiments, the search may find possible categorizations or reputation for the domains as well. This exemplary embodiment to find a connected URL, IP address, or computer file (hereinafter "file") may be broken down into three parts: (1) finding a connected URL; (2) finding a connected IP address; and (3) finding all connected files, as described below:

1. Finding a Connected URL:

Find all of the connected subdomains or the parent/grandparent domains of a given domain. Consider these as DomainList.

For each of the domains inside DomainList, find any URLs which contain the domain as part of the host portion of the URL. Consider these as UList1. Also find all the IP addresses to which the domain resolves to. Consider these as IpList.

For each IP address in the IpList, find any URLs which contain the IP address as part of the host portion of the URL. Consider these as UList2. Then find all files which connect to this IP address or have been downloaded from this IP address. Consider these as FList.

For each file in the FList, find all URLs to which this file connects to. Consider these as UList3.

All connected URLs are a union of UList1+UList2+UList3.

2. Finding a Connected IP Address:

Find all connected subdomains or parent/grandparent domains for a given domain. Consider these as DomainList.

For each of the domains inside the DomainList, find all of the IP addresses that the domain resolves to. Consider these as IpList1. Also find all the email sent from the domain as well as the attachments sent in the emails. Consider these as AttachList.

For each attachment in AttachList, find all the IP addresses that have sent an email with the same attachment. Consider these as IpList2.

All connected IP addresses are a union of IpList1+IpList2.

3. Finding all Connected Files:

Find all connected subdomains or parent/grandparent domains of a given domain. Consider these as DomainList.

For each of the domains inside the DomainList, find any URLs which contain the domain as part of the host portion of the URL. Consider these as UList.

For each of the URLs in the UList, find and files which connect to the URL or has been downloaded from the URL. Consider these as FList1.

For each of the domains inside the DomainList, find all the email sent from the domain as well as the attachments sent in the emails. Consider these as FList2.

For each of the domains inside the DomainList, find all the IP addresses to which the domain resolves to. Consider these as IpList.

For each IP address in IpList, find all the files which connect to the IP address or have been downloaded from this IP address. Consider these as FList3.

All connected Files are a union of FList1+FList2+FList3.

Accordingly, in this embodiment, the code finds connections between an observed domain name and a URL, an IP address, and all files that may be connected to the observed domain name. These connections are then examined for maliciousness, and may be utilized in the subgraph, which aids the program or user in the security analysis, increasing efficiency and effectiveness by such means as providing a greater amount of relevant security data.

Figure 6C:
FIG. 6C is a visual representation of a code which is used to find an observed IP address's connections to various other observables, in accordance with an embodiment of the present invention.

In this exemplary embodiment, FIG. 6C is a visual representation of a code 600C which is used to find an observed IP address's connections to various other observables, such as a URL, domain, or file. In various embodiments, the search may find possible categorizations or reputation for the domains as well. This exemplary embodiment to find a connected URL, domain, or file may be broken down into three parts: (1) finding all the connected domain names; (2) finding all the connected file names; and (3) finding all the URLs connected to the IP address, as described below:

1. Finding all the Connected Domain Names:

Find all domains which resolve to the given IP address, and find the related subdomains and parent domains for each domain. Consider these as DList1.

Find all emails sent from the given IP address and the attachments in the email. Consider these as AttachList.

For each attachment in AttachList, find all the domains, subdomains, and parent domains that have also sent email with the same attachment. Consider these as DList2.

All connected domains are a union of DList1+DList2.

2. Finding all the Connected File Names:

Find all the email sent from the IP address, as well as the attachments in the emails.

Consider these as FList1.

Find all the files that are connected to the IP address or have been downloaded from the IP address. Consider these as FList2.

Find all the URLs which have this IP address as the host part in the URL. Consider this UrlList.

For each URL in the UrlList, find all the files which are connected to this URL or have been downloaded from this URL. Consider these as FList3.

Find all the domains that resolve to this IP address. Additionally, find all subdomains and parent domains of the domains. Consider these as DList.

For each domain in DList, find all URLs which have the domains as the host part of them. Find all the files which connect to these URLs or have been downloaded from these URLs. Consider these as FList4.

All the files that are connected to the IP address are a union of FList1+FList2+FList3+FList4.

3. Finding all the URLs Connected to the IP Address:

Find all the URLs that have this IP address as the host part of the URL. Consider this UrlList1.

Find all domains that resolve to this IP address. Additionally, find all of the subdomains and parent domains of the domains. Consider these as DList.

For each domain in DList, find all the URLs that have the domains as the host part of them. Consider this UrlList2.

All the URLs that are connected to the IP address are a union of UrlList1+UrlList2.

Accordingly, in this embodiment, the code finds connections between an observed IP address and a URL, a domain, and all files that may be connected to the observed IP address. These connections are then examined for maliciousness, and may be utilized in the subgraph, which aids the program or user in the security analysis, increasing efficiency and effectiveness by such means as providing a greater amount of relevant security data.

In this exemplary embodiment, FIG. 6D is a visual representation of a code 600D which is used to find an observed hash's connections to various other observables, such as a URL, IP address, domain, or file, factoring in categorization and/or reputation for the connected entities as well. This exemplary embodiment to find a connected domain or IP address may be broken down into two parts: (1) finding connected malicious IP addresses; and (2) finding connected malicious domains, as described below:

1. Finding Connected Malicious IP Addresses:

Traverse through all the IP addresses where the file attachment with the hash originated as an email attachment, factoring in the reputation scores assigned to the IP addresses.

2. Finding Connected Malicious Domains:

Traverse through all the IP addresses where the file attachment with the hash originated as an email attachment, factoring in the reputation scores assigned to the IP addresses. List the domains attached to those IP addresses.

Traverse through the list of domains to find any file attachments with the hash, where those file attachments originated from an email.

Accordingly, in this embodiment, the code finds connections between an observed hash and a URL, an IP address, domain, or file. These connections are then examined for maliciousness, and may be utilized in the subgraph, which aids the program or user in the security analysis, increasing efficiency and effectiveness by such means as providing a greater amount of relevant security data.

In this exemplary embodiment, FIG. 6E is a visual representation of a code 600E which is used to find an observed URL's connections to various other observables, such as a hash, IP address, domain, or file, factoring in categorization and/or reputation for the for the connected entities as well. This exemplary embodiment to find a connected hash or IP address may be broken down into two parts: (1) finding connected hashes; and (2) finding connected IP addresses, as described below:

1. Finding Connected Hashes:

Find all domains and subdomains in the URLs.

For each domain in the list, find IP addresses and associated end points connected to files.

For each file, list the hashes.

2. Finding Connected IP Addresses:

Find all domains and subdomains in the URLs.

For each domain in the list, find IP addresses where the file attachment with the hash originated as an email attachment, factoring in the reputation scores assigned to the IP addresses.

Accordingly, in this embodiment, the code finds connections between an observed URL and a hash, an IP address, domain, or file. These connections are then examined for maliciousness, and may be utilized in the subgraph, which aids the program or user in the security analysis, increasing efficiency and effectiveness by such means as providing a greater amount of relevant security data.

Figure 7:
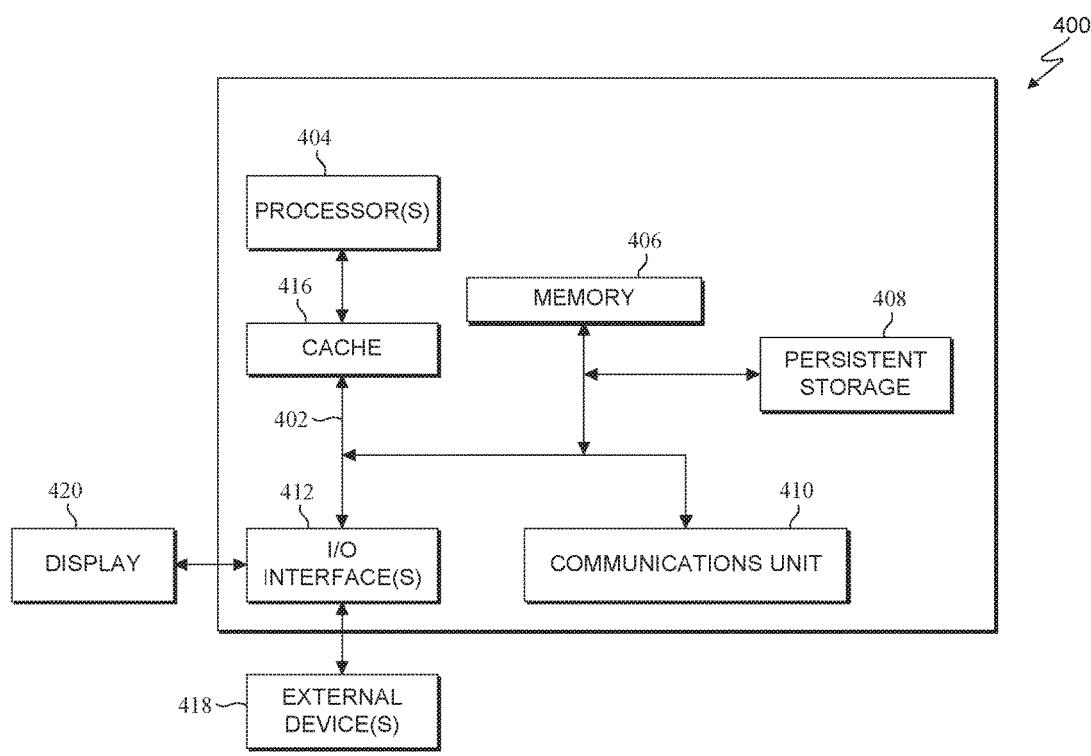
FIG. 7 is a block diagram of internal and external components of the computing device of FIG. 3, in accordance with an embodiment of the present invention.

FIG. 7 is a block diagram of internal and external components of a computer system 400, which is representative of the computer systems of FIG. 3, in accordance with an embodiment of the present invention. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to: personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In general, memory 406 can include any suitable volatile or non-volatile computer-readable storage media. Software (e.g., system&programs 134, etc.) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 410 provides for communications with other computer systems or devices. In this exemplary embodiment, communications unit 410 includes network adapters or interfaces such as a TCP/IP adapter cards, wireless local area network (WLAN) interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 410 (e.g., via the Internet, a local area network or other wide area network). From communications unit 410, the software and data can be loaded onto persistent storage 408.

One or more I/O interfaces 412 allow for input and output of data with other devices that may be connected to computer system 400. For example, I/O interface 412 can provide a connection to one or more external devices 418 such as a keyboard, computer mouse, touch screen, virtual keyboard, touch pad, pointing device, or other human interface devices. External devices 418 can also include portable computer-readable storage media such as, for example, thumb drives, portable optical or magnetic disks, and memory cards. I/O interface 412 also connects to display 420.

Display 420 provides a mechanism to display data to a user and can be, for example, a computer monitor. Display 420 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more hardware processors, a set of observables from an interfacing entity, and one or more of: a set of structured threat data and a set of unstructured threat data;
analyzing, by the one or more hardware processors, at least one of the set of observables, the set of structured threat data, and the set of unstructured threat data, wherein at least one of an observable of the set of observables, the set of structured threat data, and the set of unstructured threat data is analyzed using cognitive computing;
creating, by the one or more hardware processors, a subgraph representing the set of observables, the set of structured threat data and the set of unstructured threat data, based, at least in part, on the analysis;
transferring, by the one or more hardware processors, the subgraph to the interfacing entity;
receiving, by the one or more hardware processors, an updated set of observables from the interfacing entity;
updating, by the one or more hardware processors, the subgraph, based, at least in part, on the updated set of observables;
receiving, by the one or more hardware processors, one or more of a second updated set of observables from a different interfacing entity, a second updated set of structured threat data, and a second updated set of unstructured threat data;
further analyzing, by the one or more hardware processors, at least one of the received second updated set of observables from the different interfacing entity, the second updated set of structured threat data, and the second updated set of unstructured threat data;

further updating, by the one or more hardware processors, the subgraph, based, at least in part, on the further analysis;

transferring, by the one or more hardware processors, the updated subgraph through intelligent traversals to the interfacing entity;

removing, by the one or more hardware processors, one or more of a set of redundant data from the subgraph;

determining, by the one or more hardware processors, connections to the received set of observables, including one or more of: a uniform resource locator (URL), an internet protocol (IP) address, a domain, a subdomain, a hash, and a file;

creating, by the one or more hardware processors, a mapping structure on the subgraph based, at least in part, on the determined connections to the received set of observables;

analyzing, by the one or more hardware processors, the set of observables, the set of structured threat data, and the set of unstructured threat data utilizing a server-less computing architecture, wherein the subgraph provides a solution for at least one of: malicious software and a malicious connection to a Uniform Resource Locator (URL), an internet protocol (IP) address, a hash, or a computer file, wherein the subgraph further provides the solution on a user interface in an interactive format for a user, and wherein the solution comprises a link to a downloadable security patch and information detailing instructions to install the security patch;

displaying the subgraph on the user interface; and responsive to the user interacting with the link, installing and initiating, by the one or more hardware processors, the security patch on the interfacing entity.

* * * * *